United States Patent [19]
Beirlein

[11] Patent Number: 5,503,244
[45] Date of Patent: Apr. 2, 1996

[54] MOTORCYCLE HAVING A STUB-AXLE STEERING

[76] Inventor: Wilhelm K. Beirlein, Heinrich-Wieland-Str. 60, 81735 München, Germany

[21] Appl. No.: 190,192
[22] PCT Filed: Aug. 12, 1992
[86] PCT No.: PCT/DE92/00673
§ 371 Date: May 10, 1994
§ 102(e) Date: May 10, 1994
[87] PCT Pub. No.: WO93/03952
PCT Pub. Date: Mar. 4, 1993

[30] Foreign Application Priority Data

Aug. 13, 1991 [DE] Germany ............. 41 26 761.3

[51] Int. Cl.⁶ ................................. B62K 21/02
[52] U.S. Cl. ............... 180/219; 280/660; 280/673; 280/96.3
[58] Field of Search ................ 180/219, 227; 280/93, 96.1, 660, 661, 673, 675, 96.3

[56] References Cited

U.S. PATENT DOCUMENTS

| | | | |
|---|---|---|---|
| 3,521,904 | 7/1970 | Sheffer | 280/270 |
| 4,526,249 | 7/1985 | Parker | 180/219 |
| 4,785,905 | 11/1988 | Trema | 180/219 |
| 4,828,069 | 5/1989 | Hatsuyama | 180/219 |
| 5,014,808 | 5/1991 | Savard et al. | 180/219 |
| 5,050,699 | 9/1991 | Savard | 180/219 |
| 5,361,864 | 11/1994 | Tanaka | 180/219 |
| 5,417,305 | 5/1995 | Parker | 180/219 |

FOREIGN PATENT DOCUMENTS

| | | |
|---|---|---|
| 235040 | 9/1987 | European Pat. Off. . |
| 393218 | 10/1990 | European Pat. Off. . |
| 2905776 | 9/1979 | Germany . |
| 8911665 | 12/1989 | Germany . |

Primary Examiner—Margaret A. Focarino
Assistant Examiner—F. Zeender
Attorney, Agent, or Firm—Beveridge, DeGrandi, Weilacher & Young

[57] ABSTRACT

A motorcycle having a stub-axle steering for the front wheel (16) of the motorcycle, said front wheel (16) being suspended on the frame (2) of the motorcycle by at least one swinging arm (1) linked to a stub-axle bearer (21) journalling a stub-axle pin (3) rotatable about its longitudinal pin axis constituting the steering axis (12) about which the front wheel (16) can be pivoted, the stub-axle pin (3) being arranged in the front wheel hub (5) of the front wheel (16), the longitudinal pin axis being offset from the front wheel axis (14) towards the rear of the motorcycle and extending in the center plane of the front wheel (16) at such an angle (α [alpha]) of the steering axis with respect to the ground (15) that a positive trail (n) results. The stub-axle pin (3) is longitudinally divided and the pin sections are screwed into the front wheel hub (5) and clamped to the stub-axle bearer (21) through taper roller bearings (24).

8 Claims, 4 Drawing Sheets

MOTORCYCLE HAVING A STUB-AXLE STEERING

The invention relates to a motorcycle having a stub-axle steering for the front wheel of the motorcycle. Such stub-axle steerings have been known for a while. In contrast to steering mechanisms suspended on the steering head, the stub-axle steering allows the wheel guiding elements and the spring/absorber elements to be suspended on the main frame such that they are not pivoted with the wheel in the course of steering movements.

The advantage of a stub-axle steering resides inter alia in that the moments of inertia about the steering axis are reduced and the construction height of the motorcycle is decreased while maintaining sufficient space for spring deflection.

Every motorcycle has two critical modes of oscillation. The first mode of oscillation is the shimmy, i.e. an oscillation of the front wheel and the steering system about the steering axis. The shimmy can be obviated by increasing the trail. The trail is defined as the distance between the vertical projection of the wheel axis onto the driving ground and the extension of the steering axis to the ground. On the other hand, the trail must not be made too long, since otherwise the motorcycle becomes difficult to steer. The second critical mode of oscillation is the pendulum motion, representing a complex intercoupled oscillation of the front and rear wheel system, during which the motorcycle is subject to a steering, yawing and rolling oscillation. This oscillation can be obviated by a rake angle of the steering axis as flat (i.e. small) as possible, i.e. by an angle as small as possible between the ground and the steering axis about which the front wheel can be pivoted. Thus, the optimum is a relatively small rake angle of the steering axis in combination with a trail that is not too great. These design constraints are difficult to meet, as in conventional constructions a small rake angle of the steering axis results in too great a trail rendering the motorcycle difficult to control. The stub-axle steering probably best known is the so-called "Diffazio steering" according to which the front wheel is suspended through a stub axle on a large forked swinging arm and can be pivoted about a stub-axle pin whose longitudinal axis thus represents the steering axis as well. This steering axis extends through the center of the wheel, causing an undesirably great trail while yielding an acceptable rake angle of the steering axis. Hence, the motorcycle is difficult to steer. Moreover, the angle of steering lock is relatively tightly limited, as a result of which this type of steering has not been able to gain general acceptance for the road traffic; in Germany, for example, a possible angle of steering of at least 30° to both sides is required for obtaining administrative approval.

A further exemplary stub-axle steering is known from racing sports in the form of the "Elf-X" prototypes. Such a stub-axle steering is disclosed in the German patent specification no. 29 05 776, in which the front wheel is provided with a pivot bearing offset laterally from the center plane of the wheel and guided in a relatively complicated manner by two swinging arms arranged on one side. The steering axis formed by the pivot bearing is offset from the wheel axis towards the rear of the vehicle so that the trail does not get too long. Pivoting of the front wheel takes place by means of a relatively complicated construction comprising a track rod and lever.

A drawback of this construction resides in that the steering axis is laterally offset (in a plan view) from the longitudinal axis of the motorcycle and, thus, from the center plane of the wheel, whereby the longitudinal forces acting on the front wheel cause a steering torque which the driver has to compensate for by counter-steering.

In order to at least reduce this steering torque, attempts have been made to place the steering axis as close as possible to the center plane of the wheel. To this end, the wheel spokes were formed such as to curve arcuately at one side towards the wheel side having no swinging arm. However, this design disadvantageously implies an unfavourable distribution of forces within the wheel and causes a considerable increase in work and cost for the manufacture of the wheel, all the more as the spokes have to be more rigid due to the asymmetrical arrangement with respect to the center plane of the wheel. Not only the cost increase due to the complicated construction, but also optical reasons alone render such a front wheel unsuitable for a series production vehicle.

The invention solves the problem to provide a motorcycle of the type mentioned at the beginning having a stub-axle steering which accomplishes an optimum trail and an optimum rake angle of the steering axis in a simple and low-cost construction while not causing any torque about the steering axis in straight forward drive.

In accordance with the invention, this object is achieved by the features that the front wheel is suspended on the frame of the motorcycle by at least one swinging arm linked to a stub-axle bearer journalling a stub-axle pin rotatable about its longitudinal pin axis constituting the steering axis about which the front wheel can be pivoted, the stub-axle pin being arranged in the front wheel hub of the front wheel, the longitudinal pin axis being offset from the front wheel axis towards the rear of the motorcycle and extending in the center plane of the front wheel at such an angle of the steering axis with respect to the ground that a positive trail results.

By arranging the steering axis in the center plane of the wheel and by realizing a fixed distance—maintained even during steering—between the wheel axis and the steering axis, as suggested by the construction of the invention, the invention provides a stub-axle steering suitable for series production and achievable by using very simple parts and mass products. Owing to the fixed distance between the wheel axis and the steering axis, a positive trail necessary for stabilizing the front wheel is maintained at a value limited to a desirable extent, while allowing a desirably small rake angle of the steering axis. Therefore, the motorcycle remains controllable even when driving slowly and thus having only reduced inherent stability due to reduced gyroscopic forces.

The design of the stub-axle steering according to the invention permits the trail and the rake angle of the steering axis to be varied very easily, as the angular position of the stub-axle pin and, thus, the rake angle of the steering axis can be easily varied. In case of a construction where the front wheel is guided in a conventional fork, for example, such a variation cannot be carried out at will, since the motorcycle would otherwise resemble a so-called chopper having a small rake angle of the steering axis and, thus, a long fork.

A further advantage of the stub-axle steering according to the invention is perceivable in its low-cost production. For example, many essential parts of the stub-axle steering can be directly taken from the automobile industry, thus achieving a great cost advantage. The remaining parts are either easy to manufacture, or represent standard parts.

In addition, the very simple construction according to the invention also yields a pleasant visual appearance, which is very important for easy sale of a series motorcycle.

In accordance with a preferred embodiment of the invention, the front wheel hub is is rigidly coupled to a steering arm connected by a lower universal joint, a torque-transferring telescoping shaft and an upper universal joint to the motorcycle handlebar rotatable by the driver. In this way, a particularly compact steering can be realized. The variable length provided by the telescoping steering shaft assembly of this embodiment is required because the handlebar gripped by the driver is vertically stationary relative to the motorcycle frame, whereas the front wheel swings resiliently relative to the frame thus changing its vertical position relative to the frame. The steering arm may be made of a simple rectangular hollow profile steel. The universal joints are commercially available standard parts.

Preferably, the steering arm may have a relatively small rigidity if the shock absorber is hinged to the swinging arm and the motorcycle frame, as will be explained below. In this case, the steering arm only serves to transmit the steering forces. However, it is also possible to design the steering arm to be more rigid, and to hinge one end of a shock absorber to the steering arm and the other end of the shock absorber to the motorcycle frame. On the other hand, any other type of height compensation is possible, for instance in the form of control arms connected to simple joints. These control arms may also directly transfer the steering torque necessary for steering, resulting in a construction lacking a steering arm at all. Further, a steering assembly comprising a track rod and lever is possible.

According to a further preferred embodiment of the invention, the telescoping shaft comprises a splined shaft and a torque-transferring ball-circulating sleeve displaceable along the splined shaft. In this arrangement, the ball-circulating sleeve may be biased against the splined shaft, thus eliminating any play and achieving a great rigidity of the steering shaft assembly while assuring that the ball-circulating sleeve can be easily displaced along the splined shaft. The ball-circulating sleeve and splined shaft are likewise available as standard, and thus low-cost, parts. According to a further preferred embodiment of the invention, the stub-axle pin is longitudinally divided and the pin sections are screwed into the front wheel hub and clamped to the stub-axle bearer through taper roller bearings. By means of this design, any play can be easily eliminated by tightening the taper roller bearings against each other. Moreover, the taper roller bearings transmit great forces without getting damaged. Such great forces may occur when driving through a pothole, for example.

It is also possible, however, to employ a one-part stub-axle pin journalled in one or several axial or radial bearings. For example, an axial deep-groove ball bearing or an angular ball bearing lend themselves to this purpose. In the cheapest version, a radial deep-groove ball bearing is also possible if it is also suitable for receiving axial forces.

According to a further preferred embodiment of the invention, the stub-axle bearer has an axle extending concentrically with the front wheel, the end of said axle adjacent the wheel being rigidly coupled to a bearing shell offset laterally towards the rear of the vehicle for receiving the stub-axle pin. According to this embodiment, it is mainly for reasons of optical effect that the axle of the stub-axle bearer extends concentrically with the wheel axis. In order to nevertheless ensure the offset of the steering axis (i.e. the longitudinal axis of the stub-axle pin) towards the rear of the vehicle, the bearing shell for receiving the stub-axle pin and its roller bearing assembly have been laterally offset from the axle of the stub-axle bearer towards the rear of the vehicle. However, it is also possible to offset the axle of the stub-axle bearer from the wheel axis towards the rear of the vehicle. Alternatively, the stub-axle bearer may be completely abandoned, and an appropriate bearing shell for the stub-axle pin may be arranged directly on the swinging arm.

According to a further preferred embodiment of the invention, the swinging arm comprises only one arm in the form of a control arm having an arcuate form curving upwards and at the same time outwards with respect to the motorcycle. By using only one arm, the front wheel can be detached very easily and rapidly. Owing to the special upward curvature of the swinging arm, the front wheel can be suspended on the frame in a very compact arrangement. Owing to the special outward curvature of the swinging arm, a great steering angle of more than 30° can be ensured; such an angle is required for instance by the German TÜV (Technischer Überwachungsverein: Technical Examination Association) for approval of use in public traffic.

Preferably, a shock absorber is hinged to the control arm in the crown area thereof. In this manner, a compact mounting of the shock absorber can be achieved, at the same time enabling a sufficiently long spring travel. However, it is also possible to hinge one end of the shock absorber to any other area of the swinging arm. As already mentioned, one end of the shock absorber may be alternatively hinged to the steering arm instead of hinging said end of the shock absorber to the swinging arm. The other end of the shock absorber is normally hinged to the frame of the motorcycle.

According to a further preferred embodiment of the invention, a further arm is welded to the control arm for bracing the latter, the bracing arm having an arcuate form curving downwards and outwards with respect to the motorcycle. This embodiment ensures a bracing of the swinging arm while maintaining a steering angle range of more than 30° to both sides.

According to a preferred embodiment of the invention, the spokes are positioned symmetrically to the center plane of the wheel. The stub-axle steering of the invention allows such conventional wheels to be used although the steering axis is in the center plane of the wheel.

In the following, the invention will be explained by means of a preferred exemplary embodiment having reference to the drawings wherein FIG. 1 is a schematic side elevational view of the motorcycle having the stub-axle steering;

Figure 1:
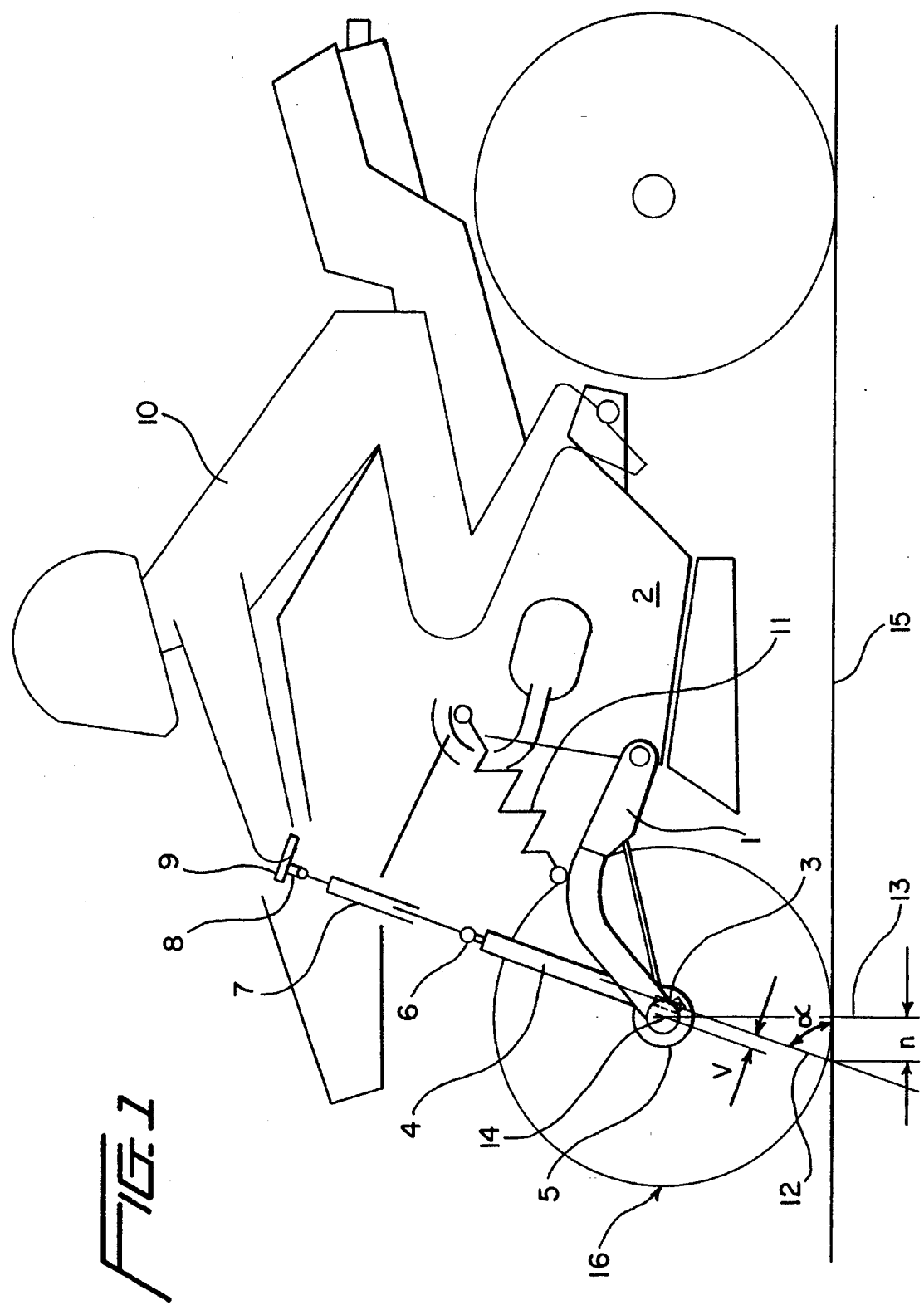

FIG. 1 shows a swinging arm 1 hinged to the frame 2 of the motorcycle. The end of the swinging arm 1 adjacent the wheel bears a stub-axle pin 3 located in the center plane of the wheel. The longitudinal axis of stub-axle pin 3 at the same time represents the steering axis 12 about which the front wheel 16 can be pivoted. A steering arm 4 has one end rigidly linked to a front wheel hub 5. The other end of the steering arm 4 is connected to a lower universal joint 6 which in turn is connected to an upper universal joint 8 through a torque-transferring telescoping shaft 7. The upper universal joint 8 is coupled to a handlebar 9 that can be gripped by a driver 10 of the motorcycle. A shock absorber 11 has one end hinged to the swinging arm 1 and the other end hinged to the frame 2.

The stub-axle pin 3 is offset rearwardly in the longitudinal direction of the motorcycle, by a distance V. The angle between the driving ground 15 and the steering axis 12 is defined as the rake angle α (alpha) of the steering axis. The distance between the vertical projection 13 of the wheel axis 14 onto the ground 15 and the extension of the steering axis 12 towards the ground is defined as the trail n. Owing to the offset V, the trail n is not excessive even if the rake angle α (alpha) of the steering axis is relatively small and although the stub-axle pin 3 can be accommodated in a very easy and cheap manner in the front wheel hub 5 in the center plane of the wheel.

When the driver 10 rotates the handlebar 9, the upper universal joint 8 rotates the torque-transferring telescoping shaft 7 whose lower universal joint 6 in turn rotates the steering arm 4 rigidly connected to the front wheel hub 5. Hence, the steering arm 4 pivots the front wheel hub 5 rigidly connected thereto, and thus the entire front wheel 16, about the stub-axle pin 3.

When the front wheel 16 is resiliently deflected upwards, the swinging arm 1 is swung upwards with respect to the frame 2, compressing the shock absorber 11 which is arranged as a spring-damper-system. As the complete front wheel 16 and thus the front wheel hub 5 and the steering arm 4 are shifted upwardly with respect to the frame 2 while the vertical position of the handlebar 9 with respect to frame 2 remains the same, the varying vertical length is compensated for by the telescoping shaft 7. The same applies correspondingly when the front wheel 16 returns downward from its resilient deflection.

Figure 2:
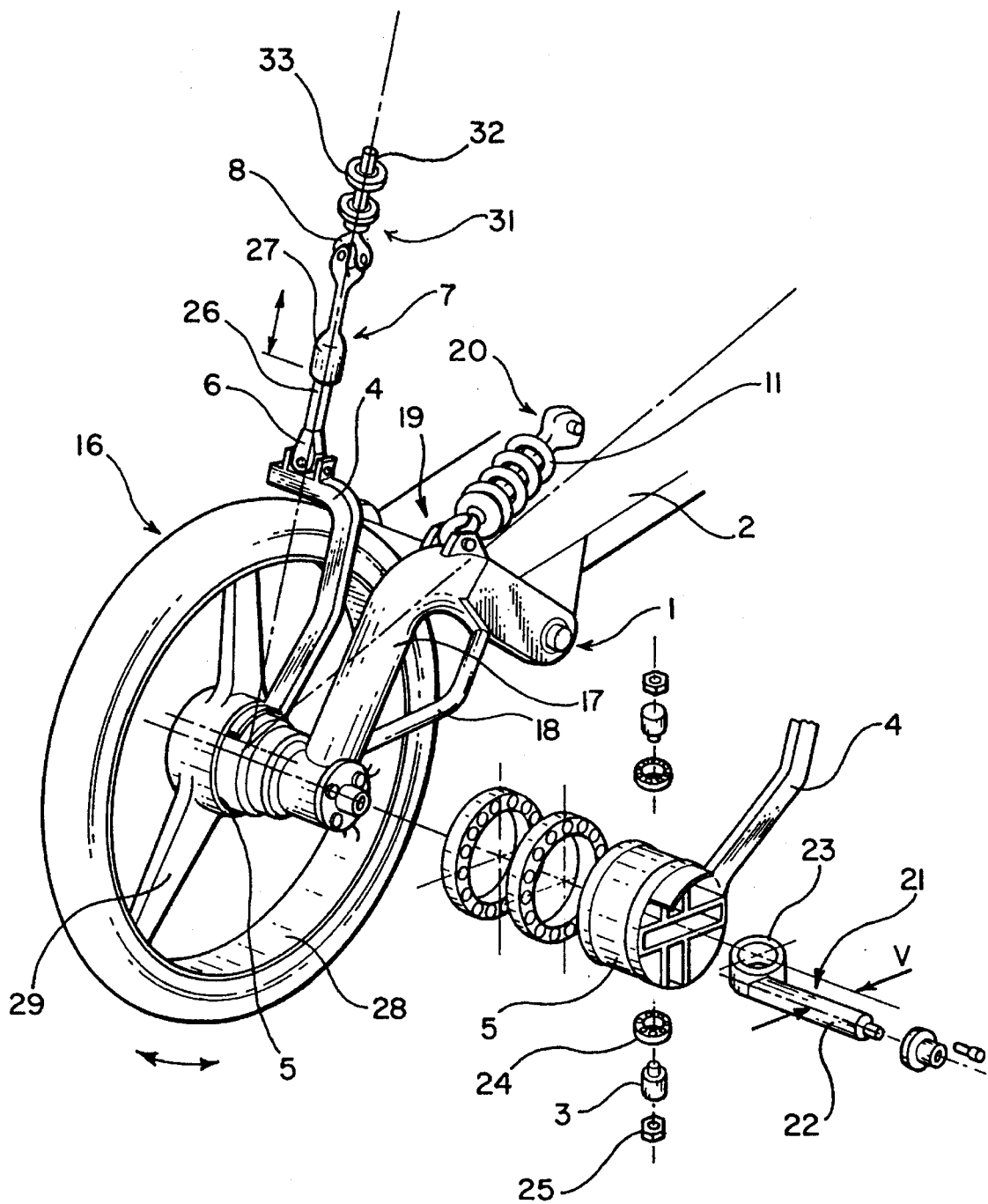
FIG. 2 is a perspective view of the front wheel suspension comprising the stub-axle steering, and an exploded view of part of the stub-axle steering.

The perspective view given in FIG. 2 illustrates the front wheel 16 suspended on the frame 2 by the swinging arm 1. The swinging arm 1 is constituted by a control arm 17 having an arcuate form curving both upwardly and outwardly with respect to the motorcycle. The control arm 17 thus comprises two end portions, one of which is hinged to the frame 2 to swing about a substantially horizontal axis, while the other end portion of the control arm 17 carries the stub-axle bearer 21 for receiving the stub-axle pin 3. The two end portions—as seen in the side elevational views according to FIGS. 2 and 4—are inclined with respect to the horizontal plane, and are connected to each other by an intermediate arcuate portion having an upper crown 19. The angle between the end portions is approximately 115° in the embodiment shown. For reasons of rigidity, a further arm 18 is welded to the control arm 17 and has an arcuate form curving both downwardly and outwardly with respect to the motorcycle. This design of the swinging arm 1 allows the front wheel 16 to be suspended on the frame 2 in a compact manner while enabling a steering lock angle of more than 30° to be realised.

A first end of the shock absorber 11 is hinged to the control arm 17 in the crown area 19 thereof, and the other end 20 of the shock absorber 11 is hinged to the frame 2. At the end of the control arm 17 adjacent the wheel, the control arm 17 carries the stub-axle bearer 21 having an axle 22 extending concentrically with the front wheel 16; the end of the axle 22 adjacent the wheel is rigidly connected by taper roller bearings 24 to a bearing shell 23 laterally offset towards the rear of the vehicle for receiving the stub-axle pin 3 longitudinally divided into two halves. The taper roller bearings 24 are clamped by means of the stub-axle pin 3 such that the bearing has no play. Counter-nuts 25 secure the stub-axle pin 3 so that it cannot unscrew. When the front wheel hub 5 is completely assembled, it is pivotably journalled in its center plane on the stub-axle bearer 21. The front wheel hub 5 is linked to a rim 28 through spokes 29. The offset V of the stub-axle pin 3, and thus the steering axis 12, from the wheel axis 14 towards the rear of the motorcycle is accomplished by attaching the bearing shell 23 in a position laterally offset from the axle 22 of the stub-axle bearer 21 concentric with the wheel axis 14.

The front wheel hub 5 is rigidly connected, e.g. welded, to the steering arm 4 whose upper end is in turn connected to the lower universal joint 6. The telescoping shaft 7 has a splined shaft 26 and a ball-circulating sleeve 27 biased against the splined shaft 26. A shaft 30 carrying the ball-circulating sleeve 27 is connected to the upper universal joint 8 whose upper end 31 is linked to a steering shaft 32 coupled to the handlebar 9 not shown in FIG. 2. The steering shaft 32 is journalled to the frame 2 by roller bearings 33.

Figure 3:
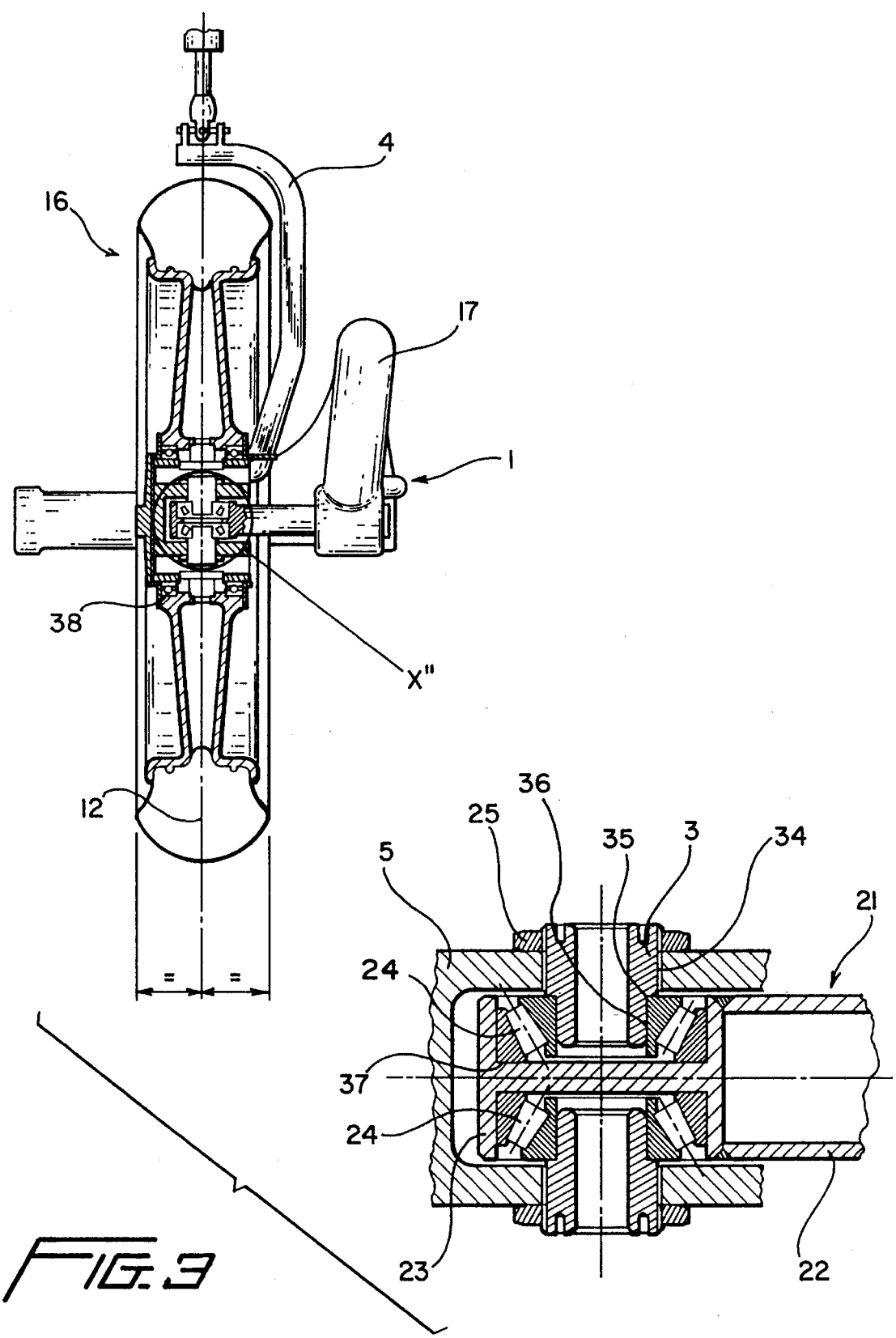
FIG. 3 is a schematic front elevational view of the motorcycle.

FIG. 3 shows a schematic front view of the front wheel suspension. The control arm 17 of swinging arm 1 can be recognised. The axle 22 of the stub-axle bearer 21 bears the front wheel 16 by means of the bearing shell 23. The stub-axle pin 3 is journalled in the bearing shell 23 in the center plane of the wheel in the taper roller bearings 24. For this purpose, each half of the stub-axle pin 3 comprises a screw portion 34, an axially oriented ring shoulder 35 adjacent the screw portion 34, and a smooth portion 36 adjacent the ring shoulder 35 and engaging the inner bearing ring of the associated taper roller bearing 24. The front wheel hub 5 is provided with a screwed bore into which the respective halves of the stub-axle pin 3 are screwed. When the halves of the stub-axle pin 3 are in their screwed positions, the inner bearing ring of the associated taper roller bearing 24 is clamped against the ring shoulder 35 of the respective half of the stub-axle pin 3, while the outer bearing ring of the associated taper roller bearing 24 is clamped against an axial ring shoulder 37 formed in the bearing shell 23 at a radial inner ring; due to this arrangement, the taper roller bearing 24 is clamped in accordance with the torque exerted on the stub-axle pin 3 when it is being screwed into the bore of the front wheel hub 5. The halves of the stub-axle pin 3 are each screwed from the outside into the associated screw bore of the front wheel hub 5 and project radially outwardly from the outer circumference of the front wheel hub 5. The stub-axle pin 3 is secured against loosening by the counter-nuts 25 screwed onto the radially outwardly projecting parts of the screw portions 34 of the halves of the stub-axle pin 3 such that the counter-nuts 25 abut the front wheel hub 5.

The longitudinal axis of the stub-axle pin 3 concurrently represents the steering axis 12 extending in the center plane of the wheel, about which axis the front wheel 16 can be pivoted by means of the steering arm 4 and telescoping shaft 7.

A further advantageous aspect of this design is that the front wheel 16 can be journalled by wheel bearings 38 in the form of radial deep-groove ball bearings having a very large nominal diameter. The large nominal diameter increases the bearing capacity of the wheel bearing 38-although the thickness of the rings and the diameter of the balls of the wheel bearing 38 can be dimensioned smaller.

Figure 4:
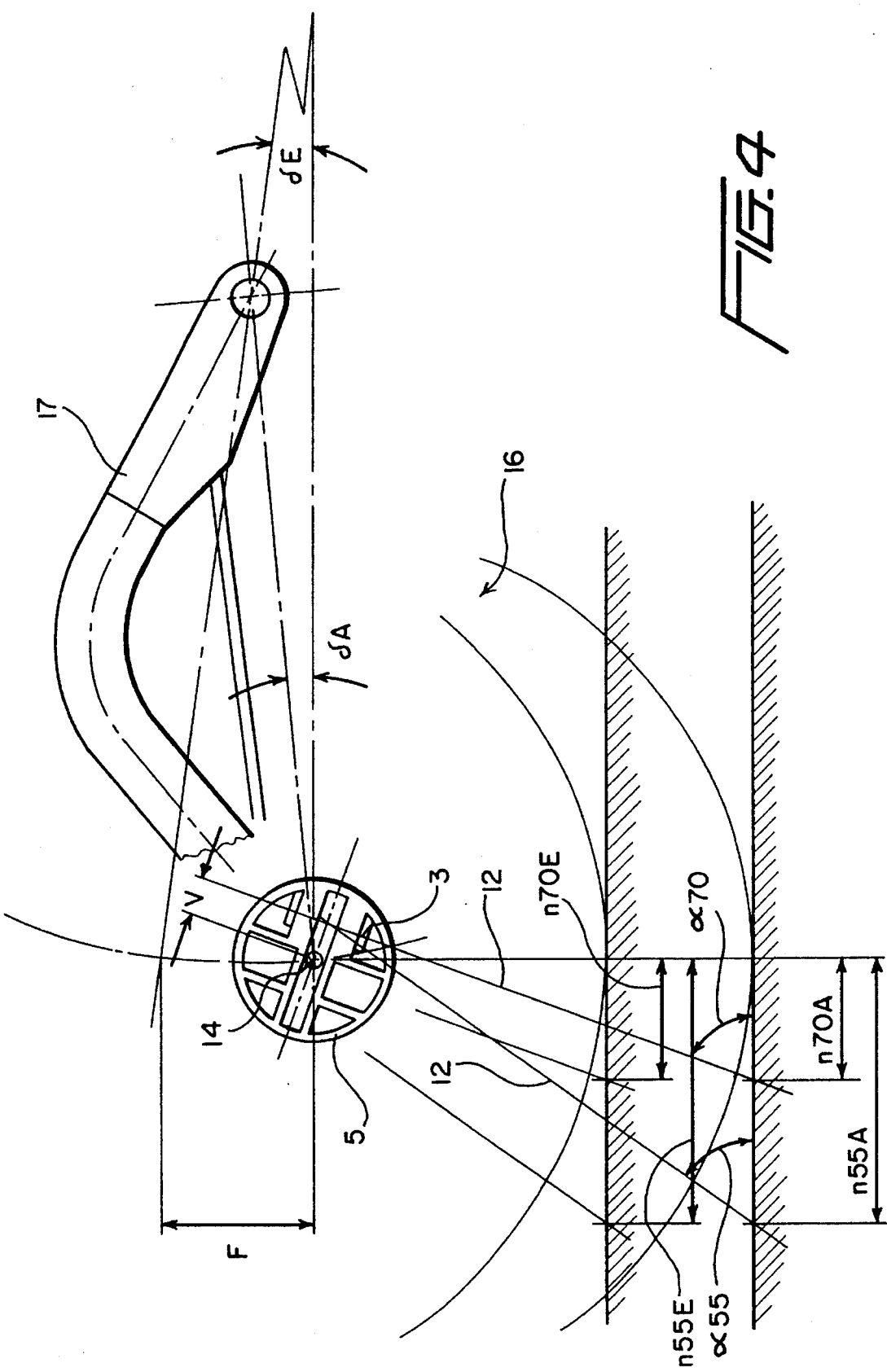
FIG. 4 is a schematic side elevational view of the front wheel illustrating geometric proportions.

FIG. 4 is a schematic side elevational view of the front wheel 16 illustrating geometric proportions. Schematically shown are the control arm 17, the stub-axle pin 3 journalled in the front wheel hub 5, the wheel axis 14 of the front wheel 16, and the steering axis 12. The Figure illustrates the state in which the front wheel 16 is resiliently deflected to the upper limit, and the state in which the front wheel 16 is not deflected. The spring deflection F is approximately 100 mm. The offset V between the front wheel axis and the steering axis is only about 25 mm in the embodiment shown but can be selected considerably longer. Reasonably, the rake angle alpha of the steering axis can be in a range of about 50° to 75°. According to the embodiment shown, the indicated trail is $n70E=100$ mm and $n70A=95$ mm in the deflected and non-deflected states of the front wheel 16, respectively, when the rake angle of the steering axis is alpha70= 70°; the trail is n55E= 201 mm and n55A=186 mm in the deflected and non-deflected states of the front wheel 16, respectively, when the rake angle of the steering axis is alpha55= 55°; and the suspension angles are deltaE=7.5° and deltaA=5° between the horizontal ground and the connecting line from the wheel axis 14 to the hinge point of swinging arm 1 at frame 2, in the deflected and non-deflected states of the front wheel 16, respectively. As is apparent from this embodiment, the trail remains approximately constant when the front wheel 16 is resiliently deflected or returned.

I claim:

1. Motorcycle having a stub-axle steering for a front wheel (16) of the motorcycle, said front wheel (16) being suspended on a frame (2) of the motorcycle by at least one swinging arm (1) linked to a stub-axle bearer (21) journalling a stub-axle pin (3) rotatable about its longitudinal pin axis constituting a steering axis (12) about which the front wheel (16) can be pivoted, the stub-axle pin (3) being arranged in a front wheel hub (5) of the front wheel (16), the longitudinal pin axis being offset from the front wheel axis (14) towards the rear of the motorcycle and extending in a center plane of the front wheel (16) at such an angle (α-alpha) of the steering axis with respect to the ground (15) that a positive trail (n) results, characterised in that the stub-axle pin (3) is divided into longitudinal pin sections and the pin sections are screwed into the front wheel hub (5) and clamped to the stub-axle bearer (21) through taper roller bearings (24).

2. Motorcycle according to claim 1, characterised in that the front wheel hub (5) is rigidly coupled to a steering arm (4) connected by a lower universal joint (6), a torque-transferring telescoping shaft (7) and an upper universal joint (8) to a motorcycle handlebar (9) rotatable by the driver (10).

3. Motorcycle according to claim 2, characterised in that the telescoping shaft (7) comprises a splined shaft (26) and a torque-transferring ball-circulating sleeve (27) displaceable along the splined shaft (26).

4. Motorcycle according to claim 1, characterised in that the stub-axle bearer (21) has an axle (22) extending concentrically with the front wheel (16), the end of said axle (22) adjacent the wheel (16) being rigidly coupled to a bearing shell (23) offset laterally towards the rear of the vehicle for receiving the stub-axle pin (3).

5. Motorcycle according to claim 1, characterised in that the swinging arm (1) comprises only one arm including a control arm (17) having an arcuate form curving upwards and at the same time outwards with respect to the motorcycle.

6. Motorcycle according to claim 5, characterised in that a shock absorber (11) is hinged to the control arm (17) in a crown area (19) thereof.

7. Motorcycle according to claim 5, characterised in that a bracing arm (18) is welded to the control arm (17) for bracing the latter, the bracing arm (18) having an arcuate form curving downwards and outwards with respect to the motorcycle.

8. Motorcycle according to claim 1, characterised in that the spokes (29) of the front wheel (16) are arranged symmetrically to the center plane of the wheel.

* * * * *